US011980890B2

(12) United States Patent
Boardman et al.

(10) Patent No.: US 11,980,890 B2
(45) Date of Patent: May 14, 2024

(54) DEVICE AND METHOD FOR TRACKING WELLS IN A MULTI-WELL PLATE

(71) Applicant: Waters Technologies Corporation, Milford, MA (US)

(72) Inventors: Anna Boardman, Watertown, MA (US); Melvin Blaze Muttikal Thomas, Stratford, CT (US); Wenhao Zhu, Natick, MA (US); Kathryn Brennan, Wrentham, MA (US); Jonathan Belanger, Whitinsville, MA (US)

(73) Assignee: Waters Technologies Corporation, Milford, MA (US)

( * ) Notice: Subject to any disclaimer, the term of this patent is extended or adjusted under 35 U.S.C. 154(b) by 280 days.

(21) Appl. No.: 17/329,324

(22) Filed: May 25, 2021

(65) Prior Publication Data

US 2021/0370307 A1 Dec. 2, 2021

Related U.S. Application Data

(60) Provisional application No. 63/031,220, filed on May 28, 2020.

(51) Int. Cl.
*B01L 9/00* (2006.01)

(52) U.S. Cl.
CPC ........... *B01L 9/52* (2013.01); *B01L 2200/025* (2013.01); *B01L 2200/087* (2013.01); *B01L 2200/14* (2013.01); *B01L 2200/16* (2013.01); *B01L 2300/041* (2013.01)

(58) Field of Classification Search
CPC ................. B01L 9/52; B01L 2200/025; B01L 2200/087; B01L 2200/14; B01L 2200/16; B01L 2300/041
See application file for complete search history.

(56) References Cited

U.S. PATENT DOCUMENTS

| | | | | |
|---|---|---|---|---|
| 4,919,894 A * | 4/1990 | Daniel | B01L 99/00 422/561 |
| 5,290,521 A * | 3/1994 | DeStefano, Jr. | B01L 99/00 D24/234 |
| 2018/0104688 A1* | 4/2018 | Panetz | B01L 3/50853 |

* cited by examiner

*Primary Examiner* — Matthew D Krcha
*Assistant Examiner* — Austin Q Le
(74) *Attorney, Agent, or Firm* — WOMBLE BOND DICKINSON (US) LLP; Deborah M. Vernon; Mark R. DeLuca

(57) ABSTRACT

A well tracking device includes a rectangular frame including four sidewalls. The sidewalls define sets of opposing grooves, and the well tracking device is configured to receive or fit on top of a multi-well plate. The well tracking device also includes a well coordinate indicator positioned on an upper portion of the rectangular frame, that includes labels associated with columns and/or rows of the multi-well plate. The well tracking device also includes at least one slider that is configured to interface with a set of opposing grooves and slide along a width or length of the rectangular frame. The slider includes a plurality of openings disposed along the elongated shape of the slider.

16 Claims, 8 Drawing Sheets

DEVICE AND METHOD FOR TRACKING WELLS IN A MULTI-WELL PLATE

CROSS-REFERENCE TO RELATED APPLICATIONS

This application claims benefit and priority to U.S. Provisional Application No. 63/031,220 filed May 28, 2020, entitled "DEVICE AND METHOD FOR TRACKING WELLS IN A MULTI-WELL PLATE." The content of which is incorporated herein by reference in its entirety.

TECHNICAL FIELD

The present disclosure relates to tracking devices for a multi-well plate and, in particular, to a device and method for tracking one or more wells in a multi-well plate.

BACKGROUND

Multi-well plates are ubiquitous in modern laboratories. Manually working with these multi-well plates, however, is cumbersome and requires laboratory experience as well as a scientist's utmost attention to execute flawless liquid handling. This is particularly the case when moving from well to well or preparing multiple samples using multiple steps. Often, any distraction can lead to the scientist selecting the wrong well, warranting complete rework of the experiment. Some attempts at solving this problem are high tech and use overly complicated lighting systems and sensors. These systems, however, are either battery powered or require input voltage to operate. Some commercially available trackers illuminate wells from below a transparent plate. However, such trackers cannot be used for sample preparation processes such as solid phase extraction (SPE). A need, therefore, exists for an intuitive device to aid in well tracking without the need for battery power or an external power supply, and which can function with SPE processes.

SUMMARY

In general, embodiments of the present technology are directed to tracking wells in a multi-well plate. In accordance with one aspect of the present disclosure, a well tracking device for a multi-well plate is disclosed. The device includes a rectangular frame including a first sidewall, a second sidewall opposite the first sidewall, a third sidewall adjacent to the first sidewall, and a fourth sidewall opposite the third sidewall, wherein a portion of the first and second sidewalls define a first set of opposing grooves, and each of the sidewalls define an interior area configured to receive a multi-well plate. The device also includes a well coordinate indicator positioned on an upper portion of the rectangular frame and including labels associated with columns and rows of the multi-well plate, wherein the rectangular frame and well coordinate indicator define a substantially rectangular opening through which the multi-well plate can be accessed. The device also includes at least one slider having an elongated shape and configured to interface with the first set of opposing grooves and slide within the first set of opposing grooves along a length or width of the rectangular frame. The slider defines a plurality of openings disposed along the elongated shape. In some embodiments, the device includes a first slider and a second slider, wherein the first slider is configured to interface with the first set of opposing grooves formed in the first and second sidewalls, and the second slider is configured to interact with a second set of opposing grooves formed in the third and fourth sidewalls and slide within the second set of opposing grooves in a direction perpendicular to a direction of movement of the first slider. In some embodiments, the openings of the first slider and the second slider have a rectangular shape and are configured to align with a plurality of wells of the multi-well plate. In some embodiments, the openings of the first slider and the second slider have a rounded shape and are configured to align with a plurality of wells of the multi-well plate. In some embodiments, the first set of opposing grooves includes notches positioned to interact with the first slider and indicate when the first slider is aligned with a column of wells in the multi-well plate, and the second set of opposing grooves includes notches positioned to interact with the second slider and indicate when the second slider is aligned with a row of wells in the multi-well plate. In some embodiments, the first slider and the second slider include a handle. In some embodiments, the interior area of the rectangular frame is configured to receive a 24-well plate, a 48-well plate, a 96-well plate, or a 384-well plate. In some embodiments, the device also includes a first retractable flexible cover secured to a first side of the at least one slider, and also retractably secured to the third sidewall of the rectangular frame; and a second retractable flexible cover secured to a second side of the at least one slider, and also retractably secured to the fourth sidewall of the rectangular frame. In some embodiments, the first retractable flexible cover and the second retractable flexible cover prevent access to any well not aligned with the openings disposed along the elongated shape of the at least one slider. In some embodiments, the first retractable flexible cover and the second retractable flexible cover are retractably secured to the third sidewall and the fourth sidewall using spring loaded rods. In some embodiments, the well coordinate indicator is removably attached to the rectangular frame. In some embodiments, the at least one slider includes labels associated with the openings disposed along the elongated shape of the at least one slider.

In accordance with another aspect of the present disclosure, a method of tracking wells within a multi-well plate is disclosed. The method includes positioning a rectangular frame over a multi-well plate. The rectangular frame includes a first sidewall, a second sidewall opposite the first sidewall, a third sidewall adjacent to the first sidewall, and a fourth sidewall opposite the third sidewall, wherein a portion of the first and second sidewalls define a first set of opposing grooves, and each of the sidewalls define an interior area configured to receive the multi-well plate. The method also includes sliding a first slider through the first set of opposing grooves of the rectangular frame to align a plurality of openings disposed along a length of the first slider with a column of wells in the multi-well plate. In some embodiments, the method also includes sliding a second slider through a second set of opposing grooves formed in the third and fourth sidewalls in a direction perpendicular to a direction of movement of the first slider to align a plurality of openings disposed along a length of the second slider with a row of wells in the multi-well plate, wherein a first opening in the first slider and a second opening in the second slider align over a particular well in the multi-well plate. In some embodiments, the first set of opposing grooves includes notches positioned to interact with the first slider and indicate when the first slider is aligned with a column of wells in the multi-well plate, and the second set of opposing grooves includes notches positioned to interact with the second slider and indicate when the second slider is aligned with a row of wells in the multi-well plate. In some embodiments, the method also includes covering wells in the multi-well plate not aligned with the first slider using a first retractable cover and a second retractable cover, each secured to the first slider. In some embodiments, the first retractable flexible cover and the second retractable flexible cover prevent access to any well not aligned with the openings disposed along the elongated shape of the slider.

In accordance with another aspect of the present disclosure, a well tracking device for a multi-well plate is disclosed. The device includes a rectangular frame including a first sidewall, a second sidewall opposite the first sidewall, a third sidewall adjacent to the first sidewall, and a fourth sidewall opposite the third sidewall. A portion of the first and second sidewalls defines a first set of opposing grooves and a portion of the third and fourth sidewalls defines a second set of opposing grooves, and each of the sidewalls define an interior area configured to receive a multi-well plate. The device also includes a well coordinate indicator positioned on an upper portion of the rectangular frame and including labels associated with columns and rows of the multi-well plate, wherein the rectangular frame and well coordinate indicator define a substantially rectangular opening through which the multi-well plate can be accessed. The device also includes a first slider having an elongated shape and defining openings, wherein the first slider interfaces with the first set of opposing grooves and can slide within the first set of opposing grooves to align with a column of the multi-well plate. The device also includes a second slider having an elongated shape and defining openings, wherein the second slider interfaces with the second set of opposing grooves and can slide within the second set of opposing grooves to align with a row of the multi-well plate. In some embodiments, the first set of opposing grooves includes notches positioned to interact with the first slider and indicate when the first slider is aligned with a column of wells in the multi-well plate, and the second set of opposing grooves includes notches positioned to interact with the second slider and indicate when the second slider is aligned with a row of wells in the multi-well plate. In some embodiments, a first opening in the first slider and a second opening in the second slider align together over a particular well in the multi-well plate.

Various aspects of the present disclosure provide one or more of the following advantages. The devices and methods disclosed herein provide an easy to use, intuitive well tracking system that does not require batteries or any external power source. The devices and methods disclosed herein also do not occupy additional bench space, as the tracking system fits on top of and around a multi-well plate. Furthermore, the devices and methods disclosed herein can be suitable for SPE processes.

Other embodiments will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed exemplary embodiments of a diffuser assembly, reference is made to the accompanying figures, wherein.

DESCRIPTION OF EXEMPLARY EMBODIMENTS

The present disclosure relates to a device and method for tracking wells in a multi-well plate. Scientists routinely use multi-well plates (e.g. 96-well multi-well plates) for sample preparation, sample clean-up, analysis, culturing, and processing, among many other applications. The high number of individual wells in a multi-well plate can create difficulties and confusion for scientists while manually handling the plates, particularly when each well requires different conditions. Although certain high-tech instruments exist to assist a user during reagent and sample pipetting, they are expensive, cumbersome, require a power source, and can occupy precious bench space.

According to some embodiments, the well tracking device disclosed herein includes a manual well tracker which seats around the top lip of a multi-well plate, such as a 96-well plate. Such a device allows the user to manually isolate specific wells on a multi-well plate during the liquid handling steps of a workflow. The user can easily manipulate the components of the tracking device to track columns of wells, rows of wells, or individual wells within a multi-well plate.

In some embodiments, the device includes two adjustable interacting components, or sliders, which slide perpendicular to one another. By aligning the two sliders in different positions, the user can physically track wells during processing and direct the user to the appropriate well or set of wells for processing.

In some embodiments, a single universal frame can include a well-locating means. In such an embodiment, the general frame can include clasps, clips, hooks, etc. that allow for different well tracking mechanisms. For example, the frame could accommodate slotted sliders, which could be replaced with sliders that have a flexible, rollable cover mechanism for pipetting columns of similar samples using a multi-channel pipette on the same multi-well plate. The frame could be in one single part with clamps, in some embodiments, to accommodate the different sliders. In other embodiments, the frame could be composed of two parts, and the different replaceable sliders can be clicked in place within the frame.

In some embodiments, the well tracking device disclosed herein can be entirely disposable, reusable, or a combination of the two. The frame, sliders, and covers could be decontaminated with bleach, ethanol, autoclaved, or another decontamination procedure for re-use. To prevent contamination of wells from drops/splashes, the contaminated sliders and/or frame could be replaced during an experiment.

Figure 1A:
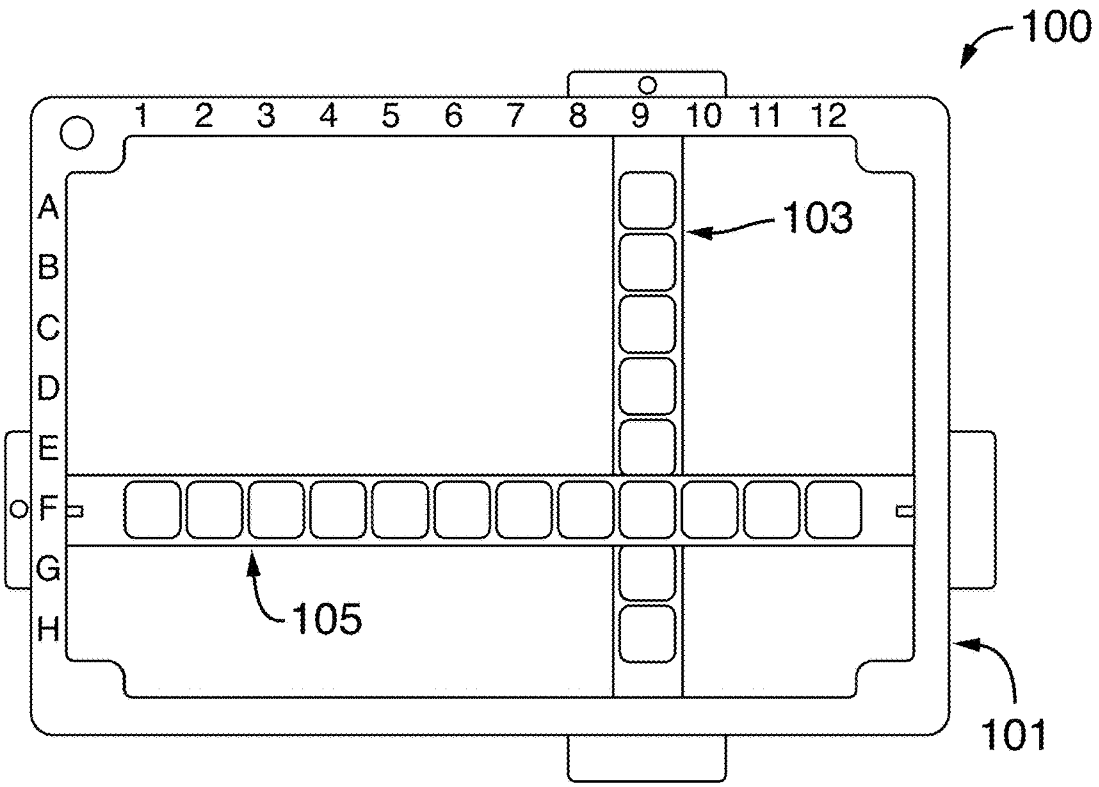
FIG. 1A shows an example well tracking device in a first position, according to embodiments of the present disclosure.

FIG. 1A shows an example well tracking device 100 in a first position, according to embodiments of the present disclosure. In this embodiment, the tracking device 100 includes a rectangular frame 101 and a first slider 103 and a second slider 105. The first slider 103 includes a number of openings and can slide in the x-direction in FIG. 1A along the columns labeled 1-12 to align the openings with a column of wells. Similarly, the second slider 105 includes a number of openings and can slide in the y-direction along the rows labeled A-H to align with rows of wells. In this arrangement, the pair of sliders are positioned to track the well at location F-9. One skilled in the art will recognize that for multi-well plates other than 96-well plates, more or fewer rows and columns would be present, and the first slider 103 can have more or fewer openings in order to align with the wells of the particular plate.

Figure 1B:
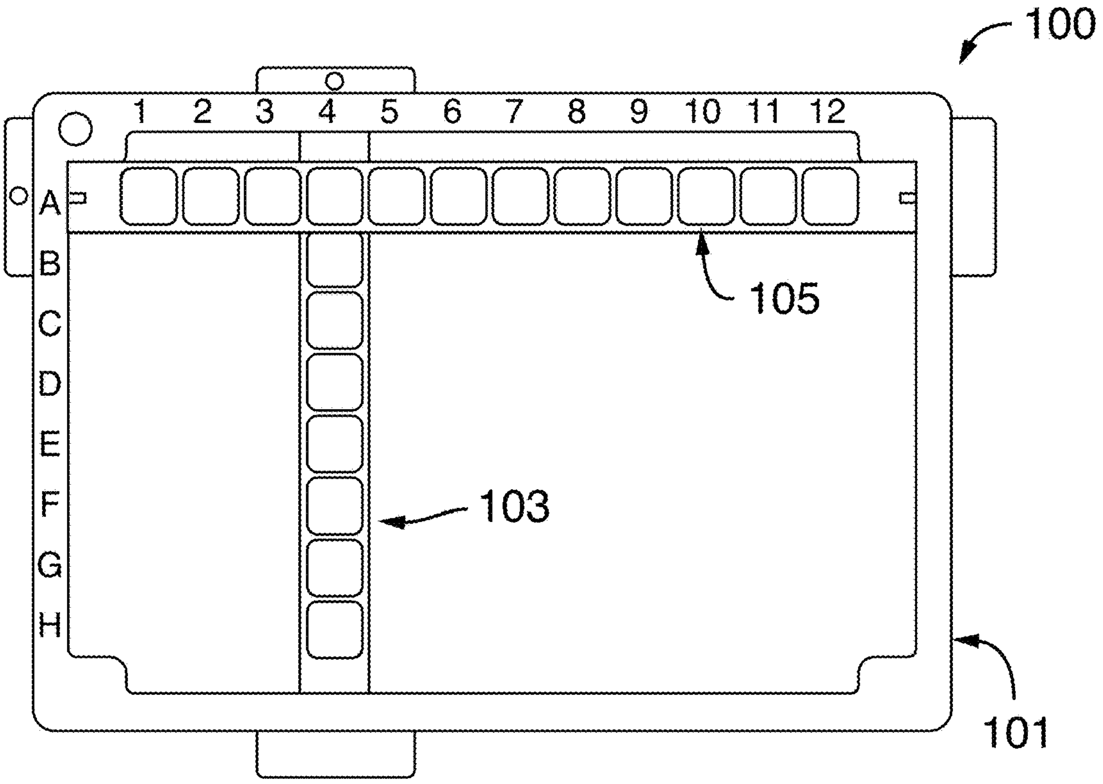
FIG. 1B shows the example well tracking device of FIG. 1A in a second position, according to embodiments of the present disclosure.

FIG. 1B shows the example well tracking device 100 of FIG. 1A in a second position, according to embodiments of the present disclosure. In this particular arrangement, the first slider 103 and the second slider 105 are positioned to track the well at location A-4. In one embodiment, the sliders can be fabricated out of differently colored translucent material. For example, if the first slider 103 were yellow, and the second slider 105 were blue, the desired well at location A-4 would appear green.

Figure 2A:
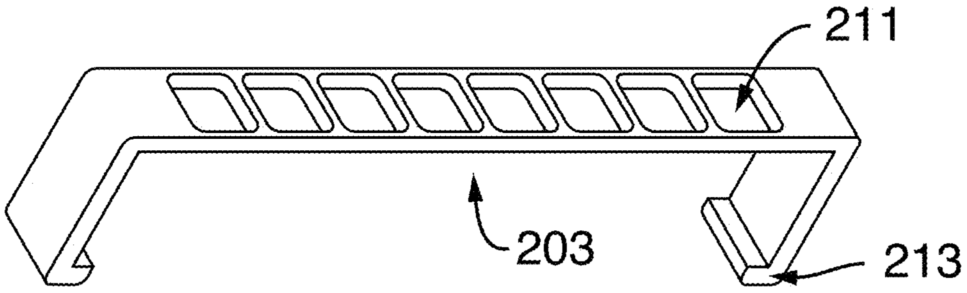
FIG. 2A shows a perspective view of an example first slider, according to embodiments of the present disclosure.
Figure 2B:
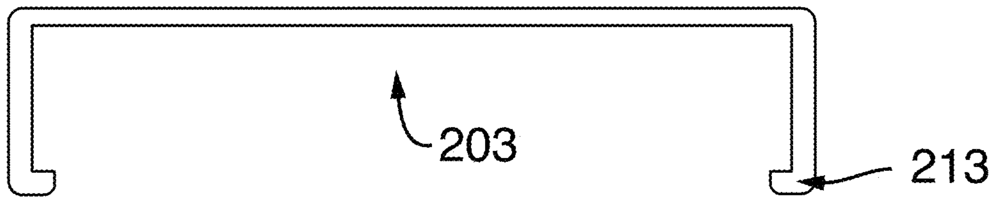
FIG. 2B shows a side view of the example first slider of FIG. 2A, according to embodiments of the present disclosure.

FIG. 2A shows a perspective view of an example first slider 203, according to embodiments of the present disclosure. In this embodiment, the first slider 203 has an elongated shape and defines a number of openings 211 along the length of the first slider 203. The first slider 203 also includes a prong 213 located at each end and configured to hook around the sidewalls of the rectangular frame of the tracking device. FIG. 2B shows a side view of the example first slider 203 of FIG. 2A, according to embodiments of the present disclosure.

Figure 3A:
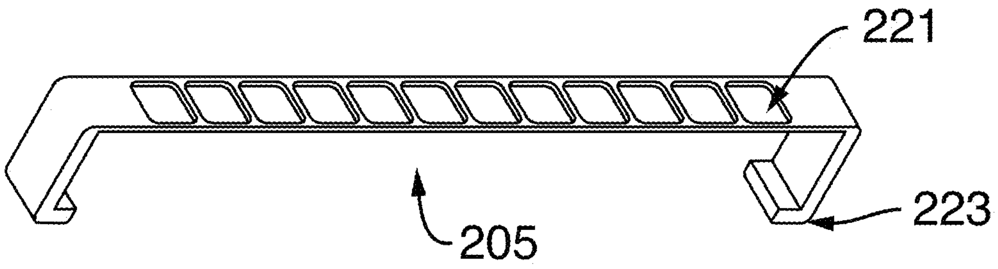
FIG. 3A shows a perspective view of an example second slider, according to embodiments of the present disclosure.
Figure 3B:
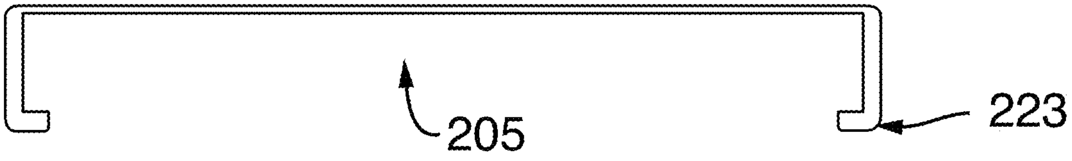
FIG. 3B shows a side view of the example second slider of FIG. 3A, according to embodiments of the present disclosure.

FIG. 3A shows a perspective view of an example second slider 205, according to embodiments of the present disclosure. In this embodiment, the second slider 205 has an elongated shape and defines a number of openings 221 along the length of the first slider 205. The second slider 205 also includes a prong 223 located at each end and configured to hook around the sidewalls of the rectangular frame of the tracking device. FIG. 3B shows a side view of the example first slider 205 of FIG. 3A, according to embodiments of the present disclosure.

Figure 4A:
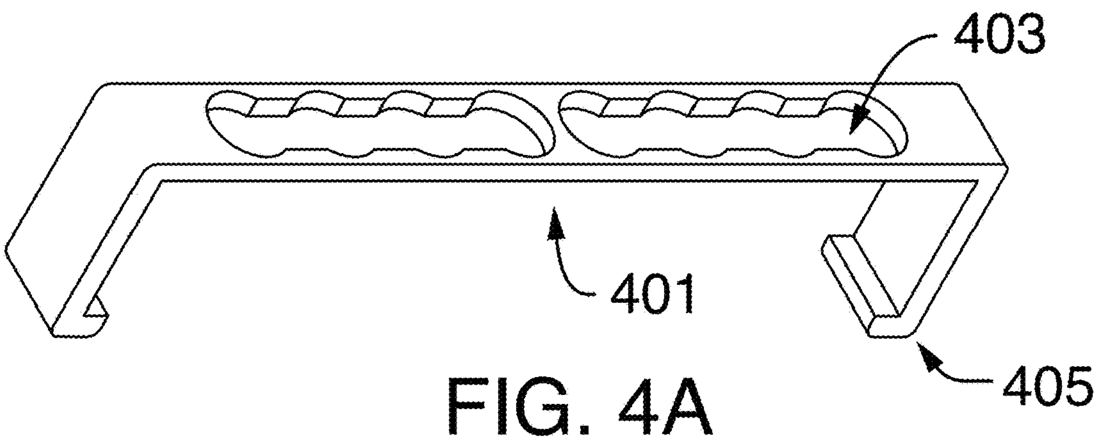
FIG. 4A shows a perspective view of an example slider with rounded openings, according to embodiments of the present disclosure.

FIG. 4A shows a perspective view of an example slider 401 with rounded openings 403, according to embodiments of the present disclosure. In this embodiment, the slider 401 also includes a prong 405 located at each end and configured to hook around the sidewalls of the rectangular frame of the tracking device. In this embodiment, rather than having an individual opening to correspond to each well of a multi-well plate, the slider 401 includes a slot 403 that opens for or spans multiple wells.

Figure 4B:
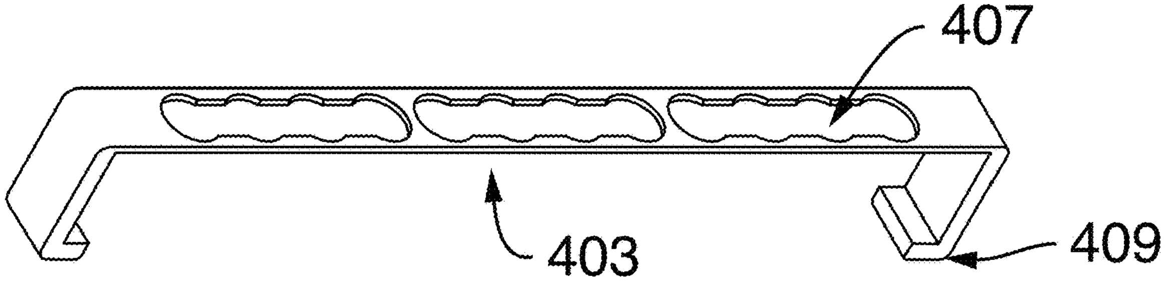
FIG. 4B shows a perspective view of another example slider with rounded openings, according to embodiments of the present disclosure.

FIG. 4B shows a perspective view of another example slider 403 with rounded openings 407, according to embodiments of the present disclosure. In this embodiment, the slider 403 also includes a prong 409 located at each end and configured to hook around the sidewalls of the rectangular frame of the tracking device.

Figure 4C:
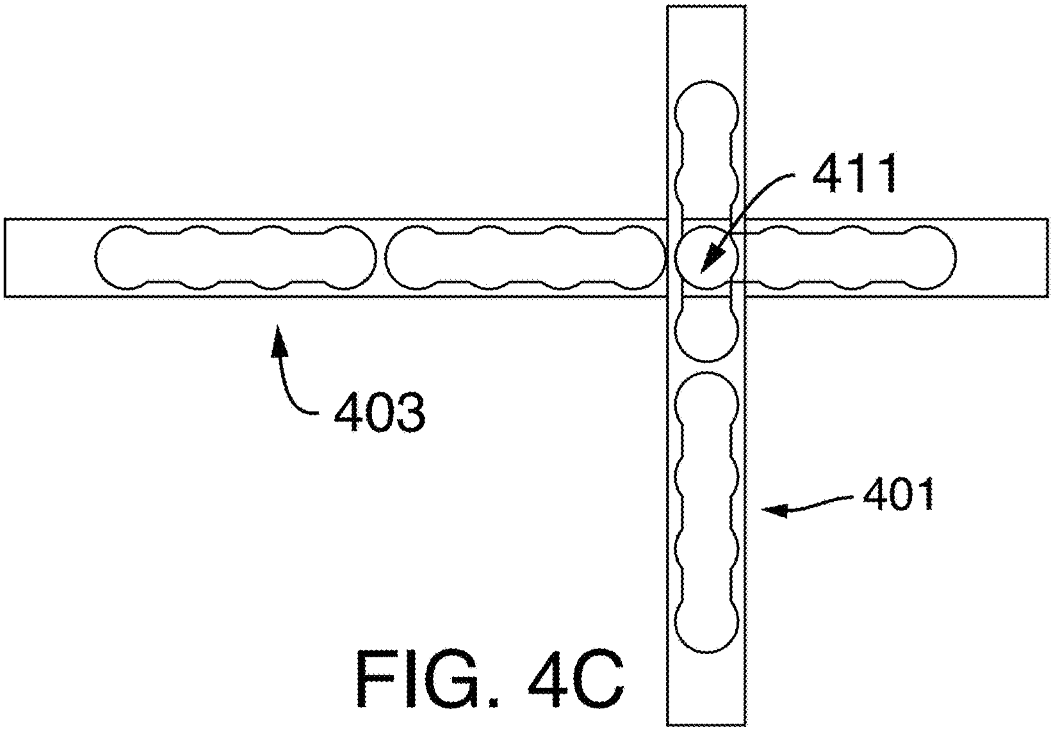
FIG. 4C shows plan view of two sliders with rounded openings overlapping at a particular location, according to embodiments of the present disclosure.

FIG. 4C shows plane view of the two sliders 401, 403 of FIGS. 4A-4B overlapping at a particular location 411, according to embodiments of the present disclosure.

Figure 5A:
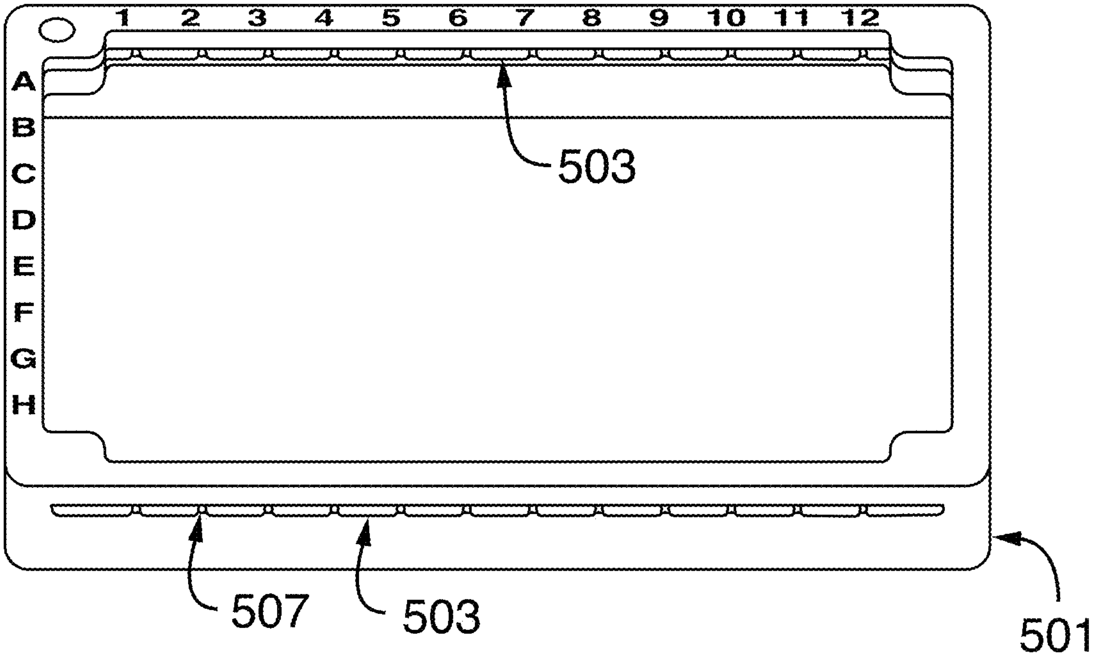
FIG. 5A shows a view of an example rectangular frame with a first pair of opposing grooves, according to embodiments of the present disclosure.

FIG. 5A shows a view of an example rectangular frame 501 with a first pair of opposing grooves 503, according to embodiments of the present disclosure. In this embodiment, the rectangular frame 501 can house the sliders and can fit over or around a multi-well plate. The rectangular frame includes vertical sidewalls which define the first pair of opposing grooves 503 or gaps.

Figure 5B:
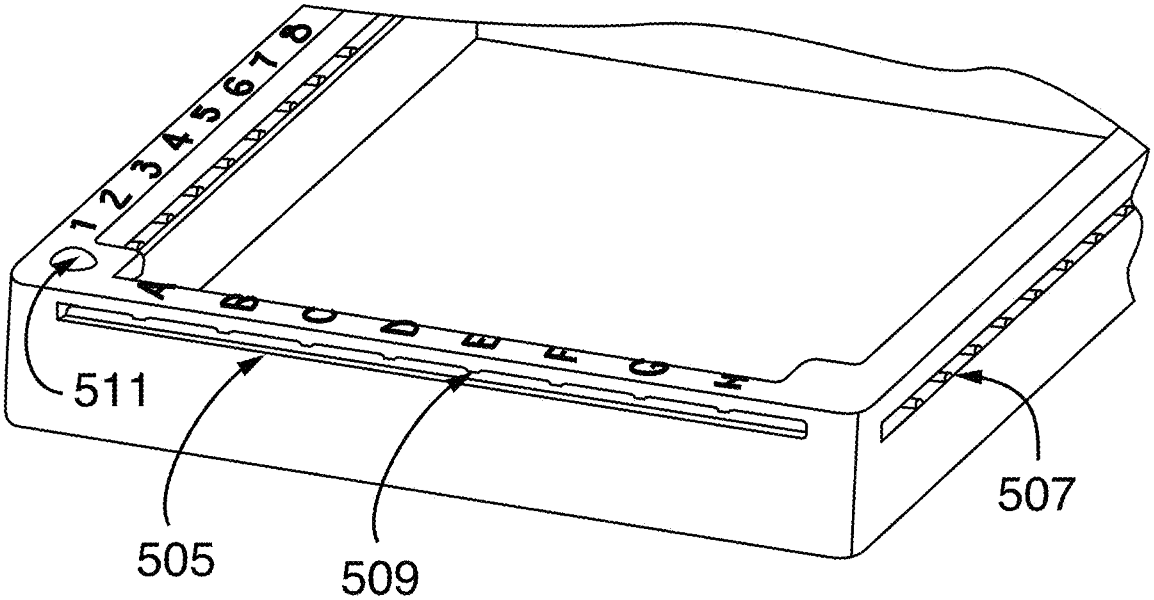
FIG. 5B shows another view of the example rectangular frame of FIG. 5A, according to embodiments of the present disclosure.

FIG. 5B shows another view of the example rectangular frame of FIG. 5A, according to embodiments of the present disclosure. In this view, one of the second pair of opposing grooves 505 is shown. In some embodiments, the opposing grooves 503, 505 can receive the sliders and provide greater slider stability and accurate slider positioning. In some embodiments, the first set of opposing grooves 503 includes a number of notches 507 positioned to interact with the first slider to indicate when the first slider is aligned with a column of wells in the multi-well plate, and to secure the first slider in position. Similarly, the second set of opposing grooves 505 include a number of notches 509 positioned to interact with the second slider and indicate when the second slider is aligned with a row of wells in the multi-well plate. In some embodiments, the notches can mate with or engage with the sliders to ensure that each slider aligns with the proper row and column. In one embodiment, the notches may only be present on one side of the slider/frame interface, or within only one of each set of opposing grooves, while the other side is free to move without hindrance within the slider/frame interface groove to enable single-handed slider manipulation.

In some embodiments, the rectangular frame 501 can be sized to accommodate a variety of different multi-well plates. In some embodiments, the rectangular frame 501 fits around the top surface of a well plate while maintaining accessibility to all wells by using a taper and/or an o-ring around the frame at the plate's collar/frame interface. The frame can also include a raised dot, a darkened spot, or other indicator 511 to indicate the A-1 corner of the frame which aligns with the A-1 corner of the plate.

Figure 6:
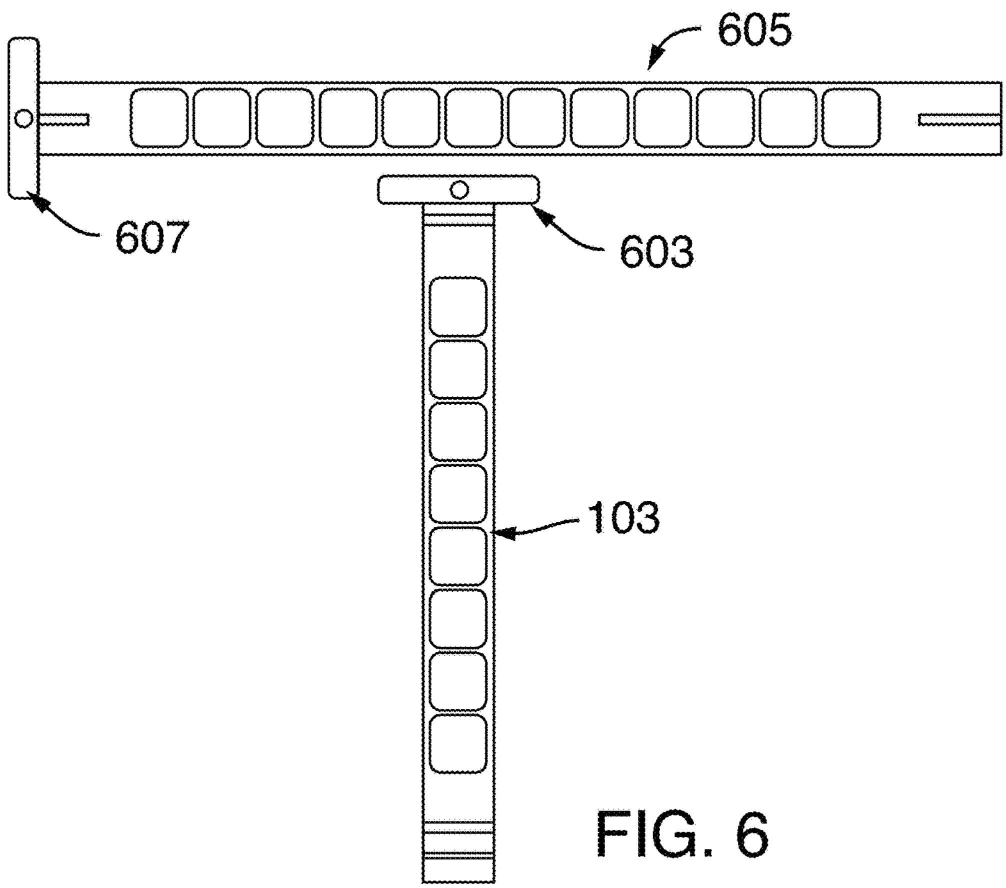
FIG. 6 shows an example pair of sliders, according to embodiments of the present disclosure.

FIG. 6 shows an example pair of sliders 601, 605, according to embodiments of the present disclosure. In some embodiments, the first slider 601 can include a first handle 603 that extends beyond the frame. Similarly, the second slider 605 can include a second handle 607 that extends beyond the frame. These handles 603, 607 can allow a user to grip and manipulate the sliders 601, 605 and move them during processing.

Figure 7:
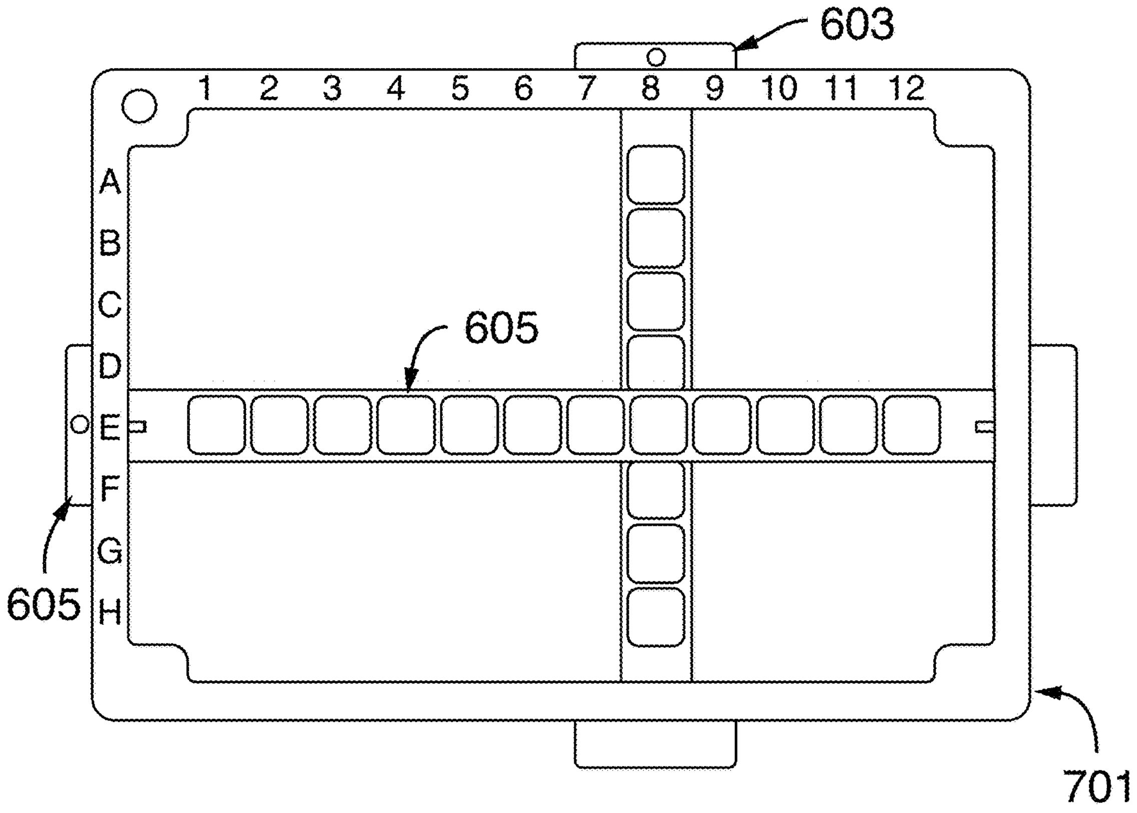
FIG. 7 shows the example pair of sliders of FIG. 6 within a rectangular frame, according to embodiments of the present disclosure.

FIG. 7 shows the example pair of sliders of FIG. 6 within a rectangular frame 701, according to embodiments of the present disclosure. In this embodiment, the handles 603, 607 extend beyond the frame 701. Manipulating the first slider 601 includes moving the slider 601 using the first handle 603 along the x-axis to the appropriate column. Manipulating the second slider 605 includes moving the slider 605 using the second handle 607 along the y-axis to the appropriate row. In this embodiment, the first slider 601 and the second slider 605 are aligned to overlap over the well at location E-8.

Figure 8:
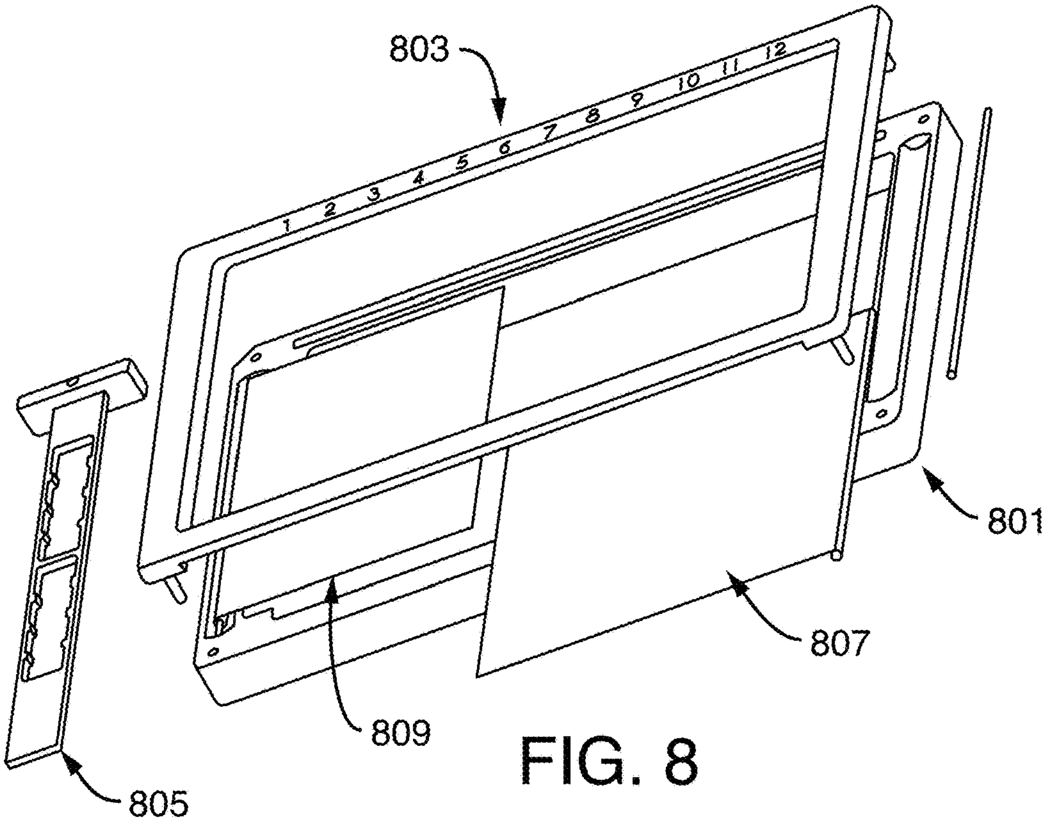
FIG. 8 shows an exploded view of an example well tracking device with retractable covers, according to embodiments of the present disclosure.

FIG. 8 shows an exploded view of an example well tracking device with retractable covers 807, 809, according to embodiments of the present disclosure. Although the sliders and frame discussed above provide a benefit by directing the user to exactly the well of interest, they do not prevent un-used well contamination through aerosols or splashing. By adding a flexible, rollable and retractable cover, which is attached to a slider on one end and rolls within the frame on the other, the cover provides protection to un-used wells. In this embodiment, a first cover 807 and a second cover 809 can each attach to opposing sides of the slider 805. The retractable covers 807, 809 can roll or retract within the frame on each end. In this embodiment, the frame includes a lower portion 801 with four opposing sidewalls, and a well coordinate indicator portion 803 that can engage with the lower portion 801. In some embodiments, the well coordinate indicator portion includes labels associated with columns and/or rows of the multi-well plate. In this embodiment, the first cover 807 rolls up completely when the slider 805 is at column position 12, and the second cover 809 rolls up completely when the slider 805 is at column position 1. Although this embodiment illustrates retractable covers 807, 809 that attach to sides of a slider 805 that can slide along the twelve columns 1-12, in alternative embodiments, the slider can be oriented perpendicular to the columns and can include 12 open positions that can slide along the eight rows, for scientists working in a particular row.

Figure 9:
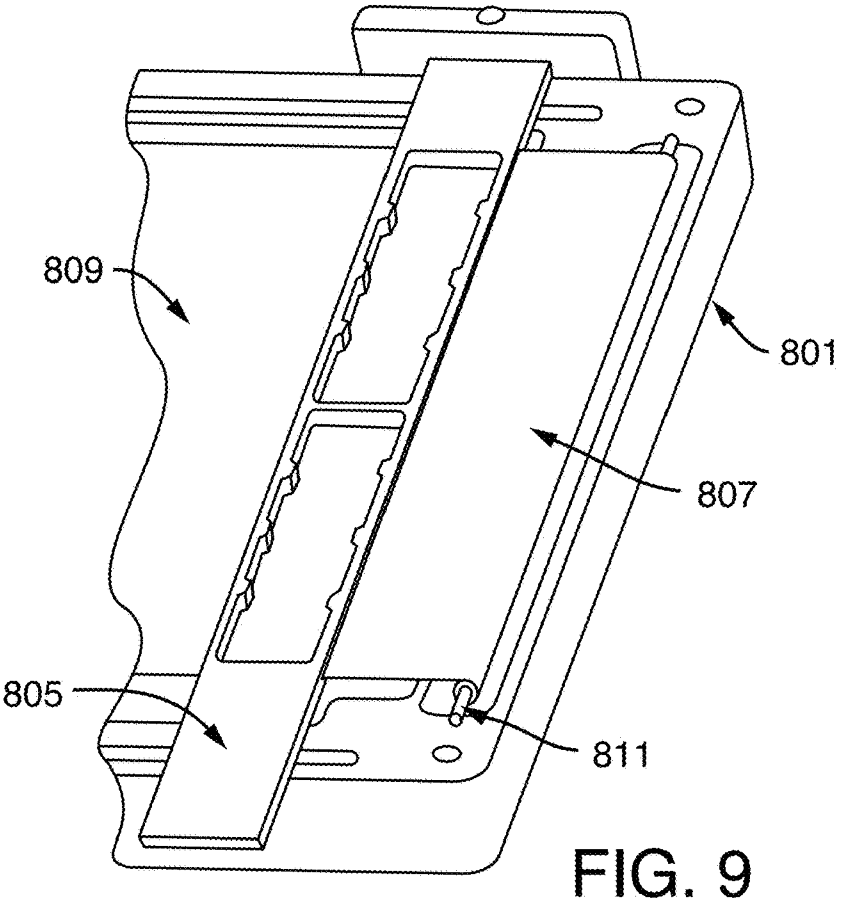
FIG. 9 shows a portion of an example well tracking device with a retractable cover, according to embodiments of the present disclosure.

FIG. 9 shows a portion of the example well tracking device of FIG. 8 with retractable covers 807, 809, according to embodiments of the present disclosure. In this embodiment, the first cover 807 and the second cover 809 are each attached to one side of the slider 805. The first cover 807 is retractable within the frame 801 using a spring-loaded pin or rod 811, in this embodiment.

Figure 10:
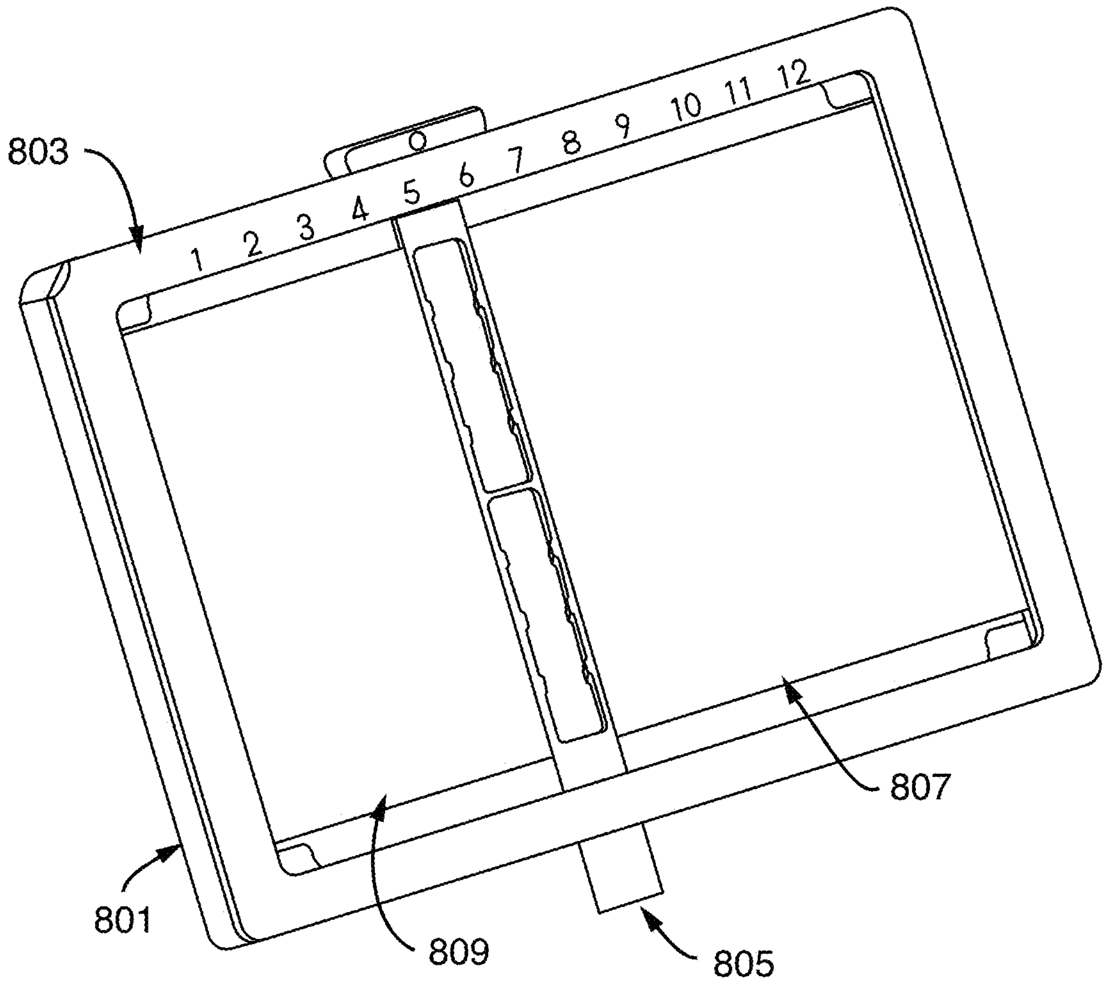
FIG. 10 shows an example well tracking device with retractable covers, according to embodiments of the present disclosure.

FIG. 10 shows an example well tracking device with retractable covers, according to embodiments of the present disclosure. In this embodiment, the first cover 807 and the second cover 809 are attached to opposing slides of the slider 805 and cover all of the wells except those located in column 5, as indicated by the well coordinate indicator portion 803 positioned on the frame 801. In an alternative embodiment, the sliders can be un-slotted and the opposing grooves for the sliders do not have notches, so that the slider positioning would simply indicate the desired row or column. Such an embodiment would be beneficial to scientists who mainly use multi-channel handheld pipettes.

Figure 11:
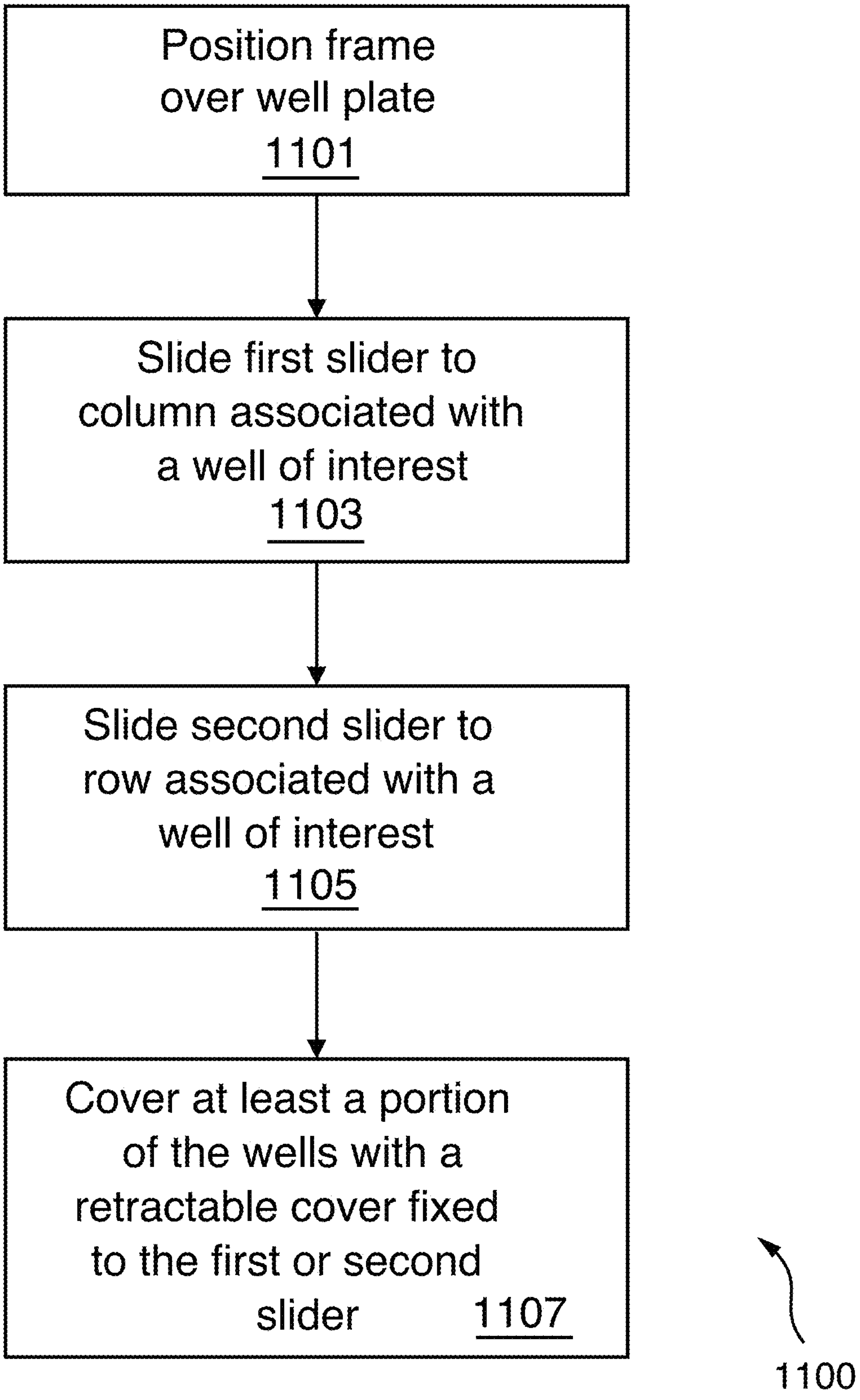
FIG. 11 is a flow chart illustrating an example method of tracking wells within a multi-well plate, according to an embodiment of the present disclosure.

FIG. 11 is a flow chart illustrating an example method 1100 of tracking wells within a multi-well plate, according to an embodiment of the present disclosure. In this particular embodiment, the method begins with positioning 1101 the frame of the well tracking device over a multi-well plate. In some embodiments, the rectangular frame fits around the top surface of a well plate while maintaining accessibility to all wells by using a taper and/or an o-ring around the frame at the plate's collar/frame interface. In some embodiments, the rectangular frame includes a set of alphabetic or numeric labels along one or more edges in order to indicate columns and rows of the multi-well plate.

The method continues with sliding 1103 a first slider to a column associated with a well of interest. As discussed above, the rectangular frame of the well tracking device can include four sidewalls, which can define opposing grooves or gaps. The sliders can fit within and engage with these grooves in order to slide in the x-direction or y-direction, with respect to the rectangular frame. In some embodiments, the grooves can include notches, which are positioned to interact with the first slider and indicate when it is aligned with a column of wells. The first slider includes a number of openings or slots which can align with a column of wells in the multi-well plate.

The method continues with sliding 1105 a second slider to a row associated with a well of interest. In some embodiments, the second slider can fit within and engage with a pair of opposing grooves in the sidewalls of the rectangular frame in order to slide perpendicular to the first slider. The second slider can also interact with notches within the pair of opposing grooves in order to indicate when the second slider is properly aligned with a row of wells. The second slider includes a number of openings or slots which can align with a row of wells in the multi-well plate.

In some embodiments, the method may also include covering 1107 at least a portion of the wells with a retractable cover fixed to either the first or the second slider. In some embodiments, a flexible, retractable cover can be attached to one or both sides of the first slider and/or the second slider. The retractable covers can also be secured to a side of the rectangular frame in order to retract within the frame. In some cases, a spring loaded rod or pin can be used to roll up the flexible covers. For example, if a pair of flexible covers is secured to both sides of the first slider, only the wells in the column aligned with the first slider will be accessible, and all other wells in the multi-well plate will be covered. In some embodiments the retractable covers are removable, disposable and can be replaced with new retractable covers. In some embodiments the retractable covers are made from flexible materials capable of handling multiple cleaning cycles and are reusable.

In addition to being used with a 96-well plate, different plate geometries can be used. In some cases, the techniques described herein can be used for plate geometries of: 2, 4, 6, 8, 10, 12, 24, 48, 384, and 1536. Different materials for the frame and/or sliders can include polypropylene, polyethylene, polystyrene, Teflon, PEEK, glass, metal, etc. In some cases, the sliders and/or the frame can be transparent or colored or textured. In some embodiments, different coatings and/or absorbent materials can be implemented in or on the device to minimize contamination. In some embodiments, the frame and handles can be textured in the polymer material to aid in the manual gripping of the device while operators require gloves to perform these tasks. In other embodiments, over molding of the stiffer structural polymer frame and handles with softer polymers could be employed for additional manual gripping capability. In some embodiments, the frame can be designed to skirt dimensions of a multi-well plate, and the sliders can extend upwards using adjustable or compressible posts. Using a base to set the frame could make the device adaptable to different multi-well plates, in some embodiments. A battery-powered motor could also be included, in some embodiments, potentially with voice activation, in order to move the sliders without the hands.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the operations in the exemplary flowcharts may be performed in a different order than the order shown. Moreover, while exemplary embodiments within this disclosure have been shown and described with references to particular embodiments, those of ordinary skill in the art will understand that various substitutions and alterations in form and detail may be made without departing from the scope of the present disclosure. Further still, other aspects, functions and advantages are also within the scope of the present disclosure.

What is claimed is:

1. A well tracking device for a multi-well plate, comprising:

a rectangular frame including a first sidewall, a second sidewall opposite the first sidewall, a third sidewall adjacent to the first sidewall, and a fourth sidewall opposite the third sidewall, wherein a portion of the first and second sidewalls define a first set of opposing grooves, and each of the sidewalls define an interior area configured to receive a multi-well plate;

a well coordinate indicator positioned on an upper portion of the rectangular frame and including labels associated with columns and rows of the multi-well plate, wherein the rectangular frame and well coordinate indicator define a substantially rectangular opening through which the multi-well plate can be accessed;

a first slider having an elongated shape and configured to interface with the first set of opposing grooves and slide within the first set of opposing grooves along a length or width of the rectangular frame, wherein the first slider defines a plurality of openings disposed along the elongated shape; and a second slider defining a plurality of openings and configured to interact with a second set of opposing grooves formed in the third and fourth sidewalls and slide within the second set of opposing grooves in a direction perpendicular to a direction of movement of the first slider.

2. The well tracking device of claim 1, wherein the plurality of openings of the first slider and the second slider have a rectangular shape and are configured to align with a plurality of wells of the multi-well plate.

3. The well tracking device of claim 1, wherein the plurality of openings of the first slider and the second slider have a rounded shape and are configured to align with a plurality of wells of the multi-well plate.

4. The well tracking device of claim 1, wherein the first set of opposing grooves includes a first plurality of notches positioned to interact with the first slider and indicate when the first slider is aligned with a column of wells in the multi-well plate, and the second set of opposing grooves includes a second plurality of notches positioned to interact with the second slider and indicate when the second slider is aligned with a row of wells in the multi-well plate.

5. The well tracking device of claim 1, wherein the first slider and the second slider include a handle.

6. The well tracking device of claim 1, wherein the interior area of the rectangular frame is configured to receive a 24-well plate, a 48-well plate, a 96-well plate, or a 384-well plate.

7. The well tracking device of claim 1, further comprising:

a first retractable flexible cover secured to a first side of the first slider, and also retractably secured to the third sidewall of the rectangular frame; and a second retractable flexible cover secured to a second side of the first slider, and also retractably secured to the fourth sidewall of the rectangular frame.

8. The well tracking device of claim 7, wherein the first retractable flexible cover and the second retractable flexible cover prevent access to any well not aligned with the plurality of openings disposed along the elongated shape of the first slider.

9. The well tracking device of claim 7, wherein the first retractable flexible cover and the second retractable flexible cover are retractably secured to the third sidewall and the fourth sidewall using spring loaded rods.

10. The well tracking device of claim 1, wherein the well coordinate indicator is removably attached to the rectangular frame.

11. The well tracking device of claim 1, wherein the first slider includes a plurality of labels associated with the plurality of openings disposed along the elongated shape of the first slider.

12. The well tracking device of claim 1, wherein a first opening in the first slider and a second opening in the second slider align together over a particular well in the multi-well plate.

13. A method of tracking wells within a multi-well plate, comprising:

positioning a rectangular frame over a multi-well plate, the rectangular frame including a first sidewall, a second sidewall opposite the first sidewall, a third sidewall adjacent to the first sidewall, and a fourth sidewall opposite the third sidewall, wherein a portion of the first and second sidewalls define a first set of opposing grooves, and each of the sidewalls define an interior area configured to receive the multi-well plate;

sliding a first slider through the first set of opposing grooves of the rectangular frame to align a plurality of openings disposed along a length of the first slider with a column of wells in the multi-well plate; and sliding a second slider through a second set of opposing grooves formed in the third and fourth sidewalls in a direction perpendicular to a direction of movement of the first slider to align a plurality of openings disposed along a length of the second slider with a row of wells in the multi-well plate, wherein a first opening in the first slider and a second opening in the second slider align over a particular well in the multi-well plate.

14. The method of claim 13, wherein the first set of opposing grooves includes a first plurality of notches positioned to interact with the first slider and indicate when the first slider is aligned with a column of wells in the multi-well plate, and the second set of opposing grooves includes a second plurality of notches positioned to interact with the second slider and indicate when the second slider is aligned with a row of wells in the multi-well plate.

15. The method of claim 13, further comprising:

covering wells in the multi-well plate not aligned with the first slider using a first retractable cover and a second retractable cover, each secured to the first slider.

16. The well tracking device of claim 7, wherein the first retractable flexible cover and the second retractable flexible cover prevent access to any well not aligned with the plurality of openings disposed along the elongated shape of the first slider.

* * * * *